United States Patent
Ho et al.

(10) Patent No.: US 11,126,207 B2
(45) Date of Patent: Sep. 21, 2021

(54) DIAPHRAGMATIC DAMPER

(71) Applicant: VE Innovation I, LLC, New York, NY (US)

(72) Inventors: David Ho, Staten Island, NY (US); Eugene Siterman, Brooklyn, NY (US); Arkady Siterman, Brooklyn, NY (US)

(73) Assignee: VE Innovation I, LLC, New York, NY (US)

( * ) Notice: Subject to any disclaimer, the term of this patent is extended or adjusted under 35 U.S.C. 154(b) by 0 days.

(21) Appl. No.: 16/953,094

(22) Filed: Nov. 19, 2020

(65) Prior Publication Data
US 2021/0089059 A1    Mar. 25, 2021

Related U.S. Application Data

(63) Continuation of application No. 16/576,232, filed on Sep. 19, 2019, now Pat. No. 10,845,826.

(60) Provisional application No. 62/735,397, filed on Sep. 24, 2018.

(51) Int. Cl.
| | |
|---|---|
| *G05D 7/01* | (2006.01) |
| *F24F 13/14* | (2006.01) |
| *F16K 1/20* | (2006.01) |
| *F16K 7/00* | (2006.01) |

(52) U.S. Cl.
CPC ............ *G05D 7/012* (2013.01); *F16K 1/2014* (2013.01); *F16K 7/00* (2013.01); *F24F 13/1426* (2013.01)

(58) Field of Classification Search
CPC ......... Y10T 137/7836; Y10T 137/7895; Y10T 137/7894; F16K 7/14; F16K 7/17; F16K 1/2014; F16K 7/00; G05D 7/012; F24F 13/1426
See application file for complete search history.

(56) References Cited

U.S. PATENT DOCUMENTS

| | | | | |
|---|---|---|---|---|
| 2,545,857 | A | | 3/1951 | Perkins et al. |
| 2,750,959 | A | | 6/1956 | Von Seggern |
| 4,241,756 | A | * | 12/1980 | Bennett ................. A61M 16/20 137/496 |
| 4,592,385 | A | * | 6/1986 | Semon ............... G05D 16/0641 137/505.13 |
| 4,712,580 | A | * | 12/1987 | Gilman ................. A61M 16/20 128/204.18 |

(Continued)

FOREIGN PATENT DOCUMENTS

DE        3208414 A1 * 9/1982 ........... F16K 31/365

*Primary Examiner* — Jessica Cahill (74) *Attorney, Agent, or Firm* — Greer Burns & Crain Ltd.

(57) ABSTRACT

A flow control device including a first channel, a second channel, and a diaphragm positioned between the first channel and the second channel, wherein the diaphragm includes a first side and a second side that faces an opposite direction as the first side. The diaphragm is configured and arranged to alternatively operate in both: a closed condition in which flow from the first channel to the second channel is impeded, and an open condition in which flow from the first channel to the second channel occurs. The diaphragm is also configured and arranged to change from the closed condition to the open condition when a force of a positive fluid flow through the first channel towards the first side of the diaphragm exceeds a combination of a gravitational force and a force of atmospheric pressure upon the second side of the diaphragm.

18 Claims, 6 Drawing Sheets

(56) References Cited

U.S. PATENT DOCUMENTS

| | | | |
|---|---|---|---|
| 5,000,221 A | 3/1991 | Palmer | |
| 5,076,322 A * | 12/1991 | Choksi | G05D 16/065 |
| | | | 137/505.13 |
| 5,144,986 A | 9/1992 | Drew | |
| 7,637,283 B2 * | 12/2009 | Hoffman | B65D 77/225 |
| | | | 137/843 |
| 8,011,363 B2 * | 9/2011 | Johnson | A62B 9/02 |
| | | | 128/201.11 |
| 8,197,231 B2 * | 6/2012 | Orr | A61M 1/3666 |
| | | | 417/395 |
| 8,528,591 B2 * | 9/2013 | Pirk | F16K 99/0001 |
| | | | 137/493.8 |
| 8,858,491 B2 * | 10/2014 | Field | A61M 5/16881 |
| | | | 604/9 |
| 9,046,192 B2 * | 6/2015 | Mescher | A61M 5/14276 |
| 10,086,135 B2 * | 10/2018 | Abai | F16K 7/12 |
| 10,671,100 B2 * | 6/2020 | Bock | G05D 16/0641 |
| 2005/0127311 A1 | 6/2005 | Shorey et al. | |
| 2008/0142091 A1 | 6/2008 | Meinig et al. | |
| 2009/0272922 A1 | 11/2009 | Bosko | |
| 2013/0150779 A1 | 6/2013 | Field | |
| 2015/0104722 A1 | 4/2015 | Rock | |
| 2015/0136137 A1 * | 5/2015 | Bugamelli | A61M 16/0683 |
| | | | 128/205.24 |
| 2018/0119586 A1 | 5/2018 | Bock et al. | |
| 2019/0309861 A1 | 10/2019 | Williams | |

* cited by examiner

DIAPHRAGMATIC DAMPER

PRIORITY CLAIM

This application is a continuation application of U.S. patent application Ser. No. 16/576,232, filed Sep. 19, 2019, which claims the benefit of U.S. Provisional Application No. 62/735,397, filed Sep. 24, 2018.

BACKGROUND

Control of fluid flow is important in HVAC systems. Currently, there are ways to control the flow based on an interaction of sensors, electrical signaling, valves, switches, software, power sources, and other mechanical and electrical components. However, these need to be maintained, are costly to produce, and sometimes even require manual participation. Also, having multiple components increases the risk that a component will be faulty or break. What is needed is an automatic fluid flow control device that obviates the need for the aforesaid components.

SUMMARY

In one embodiment, the device comprises a first channel and a second channel. The first and second channel are ideally perpendicular to one another, although other configurations may also be feasible. In one variation, the first and second channel may be orientated at an angle between 45 degrees and 90 degrees from one another. In another variation, the first and second channel may be oriented at an angle between 90 degrees and 135 degrees from one another. In a third variation, the first and second channel may be oriented at an angle within one of the following ranges: 0-15 degrees, 15-30 degrees, 30-45 degrees, 45-60 degrees, 60-75 degrees, 75-90 degrees, 90-105 degrees, 105-120 degrees, 120-135 degrees, 135-150 degrees, 150-165 degrees, and/or 165-180 degrees.

In one embodiment, the first and second channel each comprise a first end and a second end. The first and second channel may also each comprise one or more walls. The one or more walls of a channel can be singular in the case of a circular or ovular channel, double in the case of a hemispherical channel, triple, quadruple, or any other number suitable to an appropriate geometry. The one or more walls may terminate in an end, as described above, for a given channel.

The channels, walls, and ends may be made of one or more structurally beneficial materials, such as aluminum, steel, other metals or metallic alloys, plastic, PVC, or other polymers, ceramic, cement, concrete, or other mixtures, or even fabric or textile. The components may be threadably engaged, adhered, fused together, molded as a single piece, sewn, or otherwise attached. The channels may constitute ducts, pipes, or other common flow conveyance means.

The first end of the first channel may be joined to the first end of the second channel, with the second ends of each being positioned on opposite sides of the first ends. The first ends may be joined via one or more walls. In one variation, one wall of the first channel merges with one wall of the second channel, while other walls do not merge. The location or configuration where the first ends are joined will be referred to hereon as the point of jointure.

The point of jointure may be comprise a width, length, and/or height between 1-2 inches, 1-4 inches, 1-6 inches, 1-12 inches, or any higher multiple thereof. The width, length, and/or height may have a minimum of 2, 3, 4, 5, 6, 8, 10, 12 inches, or any higher multiple thereof.

The point of jointure may feature a diaphragm, damper, or other flow limiting device (from hereon, diaphragm). Configurations may be contemplated that permit binary or gradated flow control. Ideally, the damper constitutes an on/off damper.

The material of the diaphragm may be an elastomeric material, either natural or synthetic, such as rubber, saturated or unsaturated, or thermoplastics of any kind. Ideally, the material is a metalloid such as silicon or silicone.

The material of the diaphragm may be a span of material naturally flat or contoured at room temperature or another temperature above glass-transition. The diaphragm may be attached at the ends of the channels, specifically at one or more walls thereof. The diaphragm may be stapled, glued, molded, fused, bolted, or otherwise adhered or bound to the walls. Preferably, the seal between the diaphragm perimeter and the walls should be airtight. The central portion of the diaphragm may be kept virgin or reinforced. The diaphragm may comprise one or more layers, with each layer being made of identical or different materials, with different materials selected for different reactivity properties, durability profiles, or flex or stretch potentials.

The diaphragm may be disposed entirely in the point of jointure or stretch into, onto, or around the channels. The diaphragm may be partially or fully caged, covered, or exposed at the point of jointure.

The diaphragm may be positioned and oriented at an angle from far walls of channel ends, with the near walls of channel ends joined together. Ideally, the first channel is vertically disposed and the second channel is horizontally disposed, so that the two channels are substantially perpendicular. Additionally, the diaphragm is oriented at an angle between 25 and 65 degrees from the axes of the channels.

In one variation, the first end of the vertically disposed channel are horizontally disposed and the first end of the horizontally disposed channel are vertically disposed—which is to say that the edge of each end is aligned perpendicular to the axis of each channel. In this variation, the diaphragm may be thermoformed to adhere to the 90 degree jointure of the ends, thereby providing a three-dimensional perimeter. In another variation, wall extensions are adapted to the walls of the channels and provide a sloped edge to the channels, or the walls themselves extend to provide said slope. In this variation, the diaphragm edges are attached to the sloped edge, thereby providing a flat or two dimensional perimeter.

The contour of the diaphragm in this configuration may be sufficiently concave, in a direction toward the jointure of the near walls of the channels, such that one, or both, of the openings of the channels are sealed by the diaphragm, thereby preventing communication of flow between the two channels. This concave contour may be the result of a combination of the thickness or thinness of the diaphragm, the stretch sensitivity of the material to an applied force, and the forces of gravity and atmospheric pressure. In the presence of a positive fluid flow in a direction opposite the forces of gravity and atmospheric pressure, the stretch sensitivity may be such that the concavity decreases, thereby approaching a flatness or flatness average of material, or even convexity in a direction away from the jointure of the near walls of the channels, such that the openings of the channels are unsealed, thereby permitting communication of flow between the channels. Ideally, the threshold volumetric flow that overcomes gravity and atmospheric pressure exceeds the volumetric flow of the undesired fluid flow coming from the opposite, angular, or perpendicular direction.

The stretch sensitivity of the material may fall between 0 and 5, 5 and 10, 10 and 15, 15 and 25, 25 and 30, or 40 and 50 on Scale A, or between 0-15, 15-20, 20-25, or 25-30 on Scale 00.

The diaphragm material may comprise a thickness described by any of the following ranges: less than 0.1 inch, 0.1-0.5 inches, 0.5-1 inch, 1-2 inches, 2-4 inches. The thickness may alternatively be determined by a ratio of the surface area, length, and/or width of the material. For example, the material may have a thickness to surface area ratio of 1/5, 1110, 1/15, 1/20, 1/25, 1/50, 1/100, 1/150, 1/200, or any other appropriate number.

The diaphragm may be used in conjunction with or without mechanical or electro mechanical valves, pumps, levers, sensors, motors or other common HVAC (or air flow) devices or components. The diaphragm may or may not be coupled with secondary flow impeders or primary flow amplifiers, such as suction, vacuum, or fan devices.

In another embodiment, the device may comprise a plurality of channels. Some channels may constitute a first class of channels while other channels may constitute a second class of channels. Principally, the first class of channels are arranged in an HVAC system to convey a primary flow and the second class of channels are arranged in an HVAC system convey a secondary flow. The primary and secondary flow may be distinguished by temporal, volumetric, or situational signatures. In an alternative framework, the first and second class of channels are distinguished based on the direction of their flow with respect to gravity and/or atmospheric pressure. For instance, one class of channels may convey flow whose velocity is not impeded or facilitated by these forces, while another class of channels may convey flow whose velocity is impeded or facilitated thereby. In yet another framework, the flow of one class is either facilitated by or indifferent to these forces. In yet another framework, the flow of one class is either impeded by or indifferent to these forces. In yet another framework, the flow of one class is schematically "upstream" while another is "downstream".

In one variation, each channel of the first class of channels may be run substantially in parallel with one another for a distance of 4 inches or more. In another variation, each channel may run in parallel for a distance less than 4 inches. Similarly, each channel of the second class of channels may run substantially in parallel with one another for a distance of 4 inches or more. In another, but not exclusive variation, one or more channels of a class of channels may have orthogonal configurations vis-a-vis other channels of the same class of channels. That is to say, that the flow of one channel may be at a first angle from a second channel, a second angle from a third channel, and the second and third channel may be at a third angle from one another. The first, second, or third angles may fall within any of the following ranges: 0-15 degrees, 15-30 degrees, 30-45 degrees, 45-60 degrees, 60-75 degrees, 75-90 degrees, 90-105 degrees, 105-120 degrees, 120-135 degrees, 135-150 degrees, 150-165 degrees, and/or 165-180 degrees.

In one variation, each channel of the first class of channels may merge with one another prior to or at the point of jointure into a single channel. In another variation, one or more channels of the first class of channels may each comprise a first end and each or many first end of first class channels may independently access the point of jointure. These arrangements are also possible for the second class of channels.

DETAILED DESCRIPTION

Figure 1:
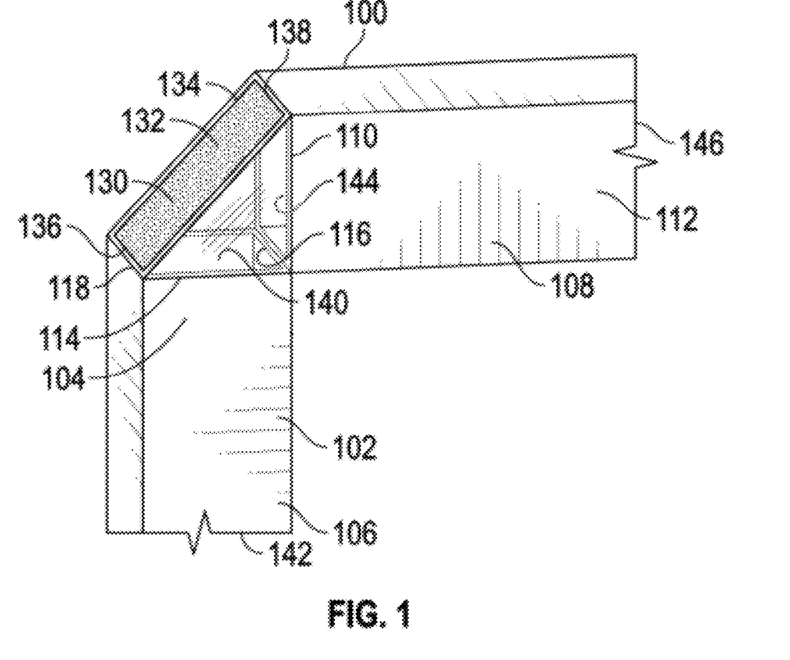
FIG. 1 shows an exemplary device set-up, including two channels and a damper.

As shown in FIG. 1, the device 100 features a first channel 102 having a first end 104 and a second end 106 and a second channel 108 having a first end 110 and a second end 112. The first end of the first channel may comprise one or more walls 114, including a near wall 116 and a far wall 118. A diaphragm 130 may feature a central portion 132, a perimeter 134, a first end 136, and a second end 138. The first channel features a first opening 140 and a second opening 142 and the second channel features a first opening 144 and a second opening 146.

Figure 2:
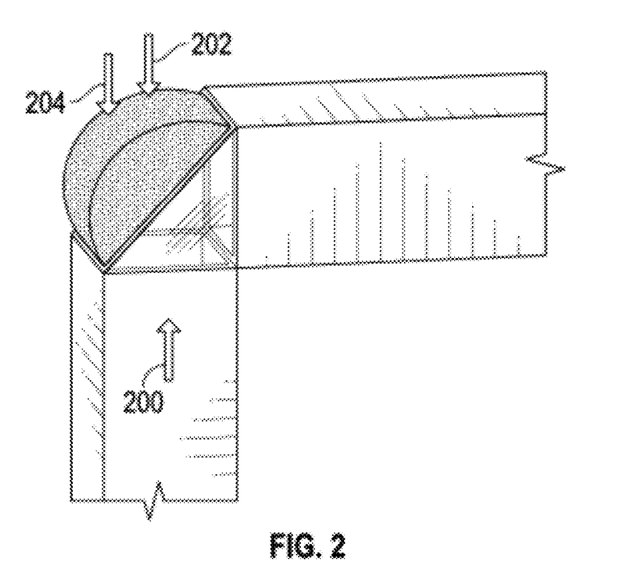
FIG. 2 shows an exemplary device in a positive fluid flow system.

As shown in FIG. 2, the central portion of the diaphragm is in a convex orientation when positive fluid flow 200 overcomes the force of gravity 202 and atmospheric pressure 204.

Figure 3:
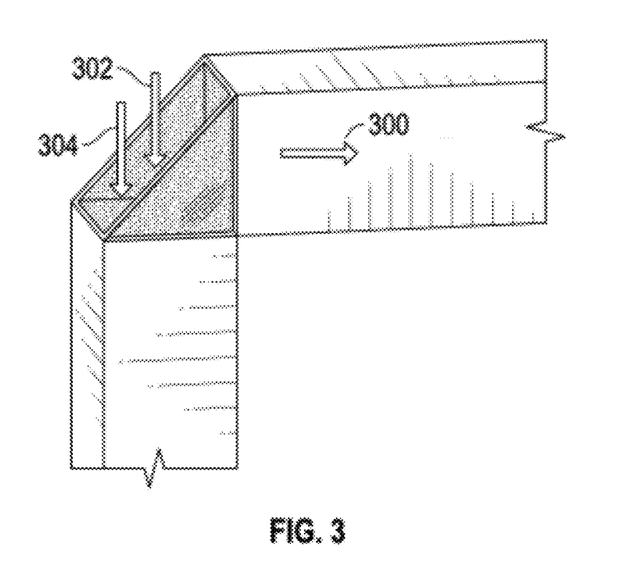
FIG. 3 shows an exemplary device in a neutral fluid flow system.

As shown in FIG. 3, in the absence of a positive air flow, or when the positive fluid flow 200 does not overcome atmospheric pressure 304 and the force of gravity 302, the diaphragm will be in a generally concave orientation. In the presence of negative fluid flow 300, the diaphragm will seal the channel(s).

Figure 4:
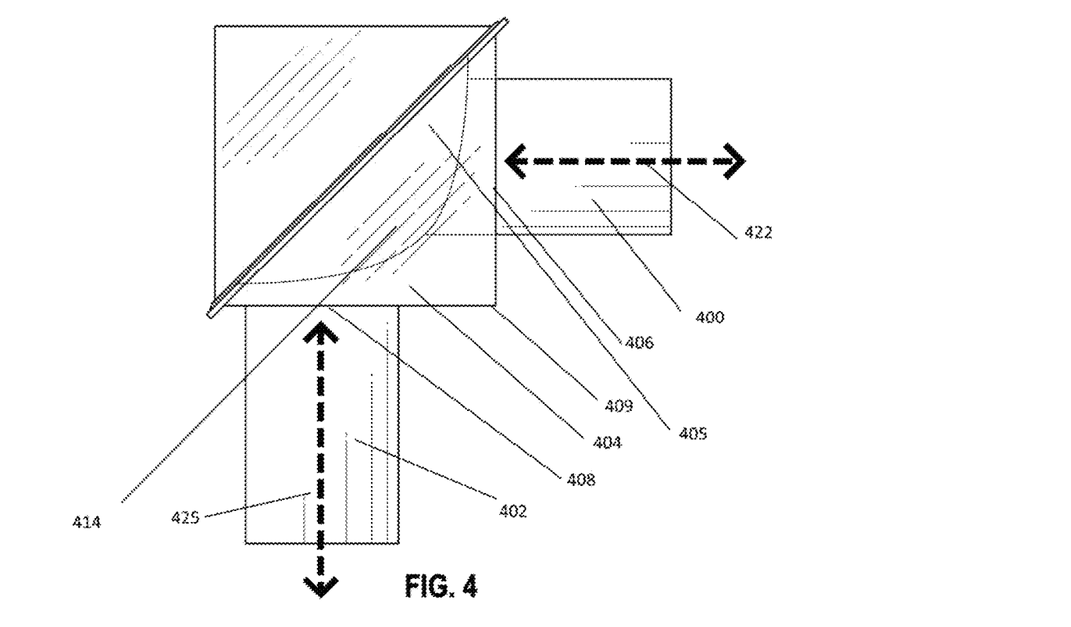
FIGS. 4-5 show an exemplary elbow flow control device in a closed condition.
Figure 5:
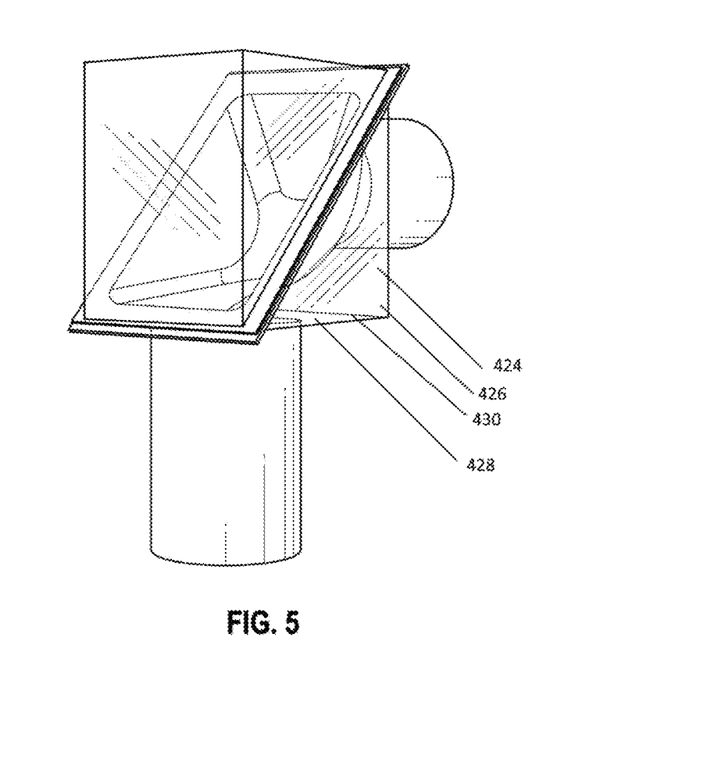

As shown in FIGS. 4-5, the flow control device may comprise a first channel 400, a second channel 402, and a diaphragm section 404. The diaphragm section may encase a diaphragm 405, a first end 406, a second end 408, and an opposing wall 409. The first end may connect to the first channel and the second end may connect to the second channel.

Figure 6:
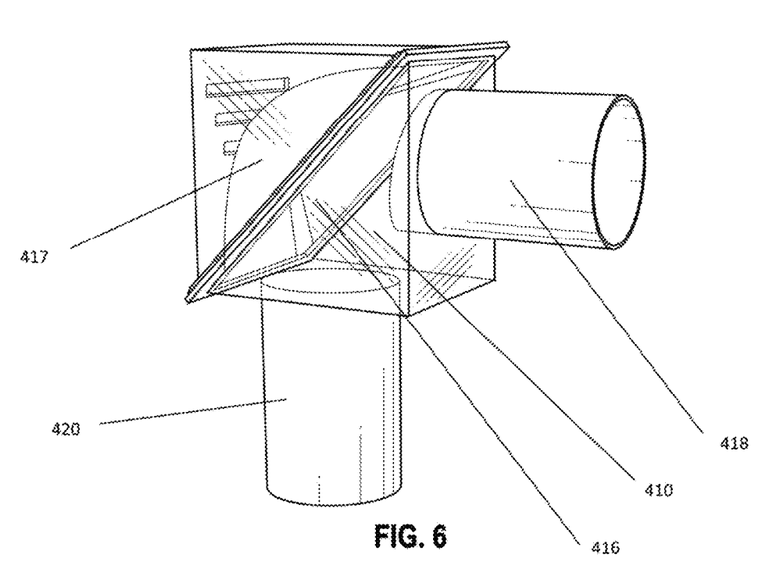
FIGS. 6-7 show an exemplary flow control device in an open condition.
Figure 7:
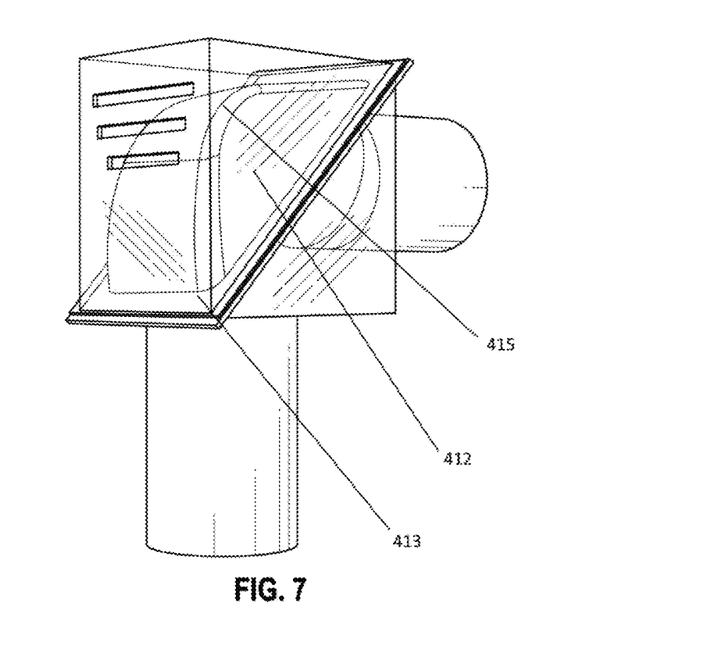
Figure 8:
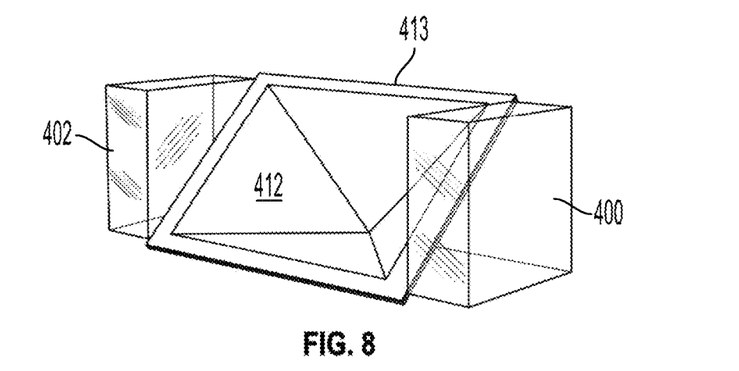
FIGS. 8-10 show an exemplary flow control device in a closed condition.
Figure 9:
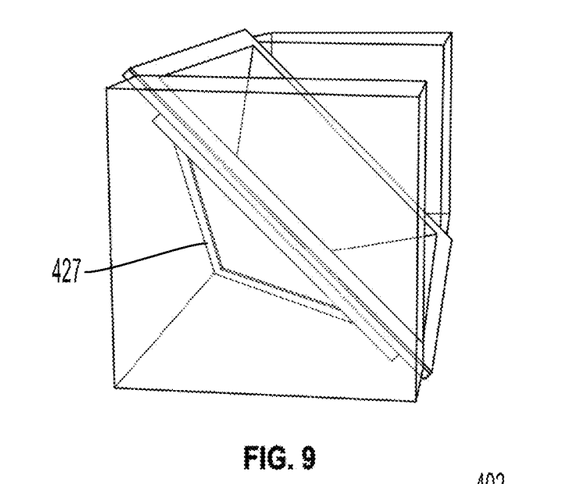
Figure 10:
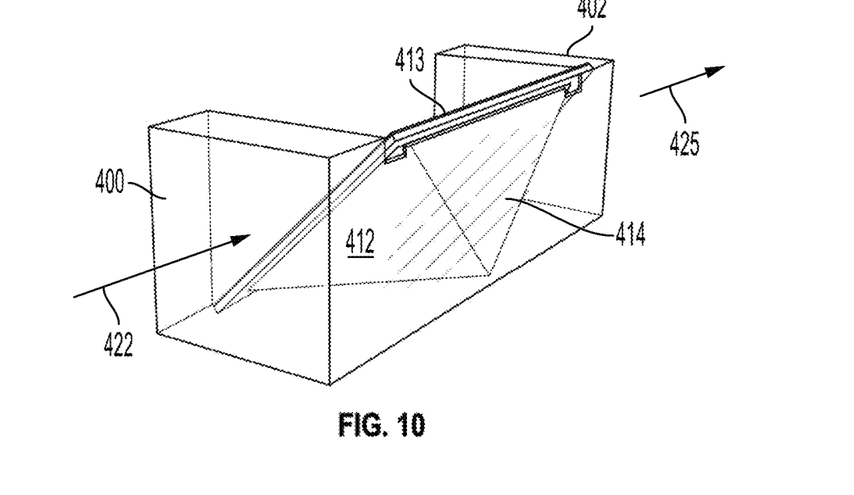
Figure 11:
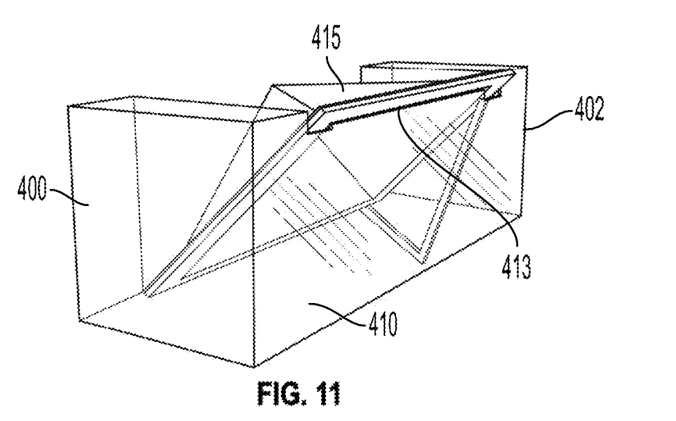
FIGS. 11-13 show an exemplary flow control device in an open condition.
Figure 12:
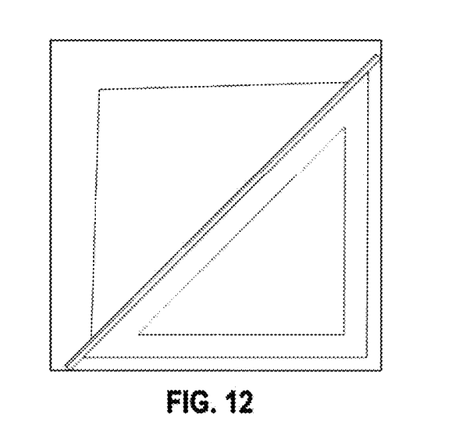
Figure 13:
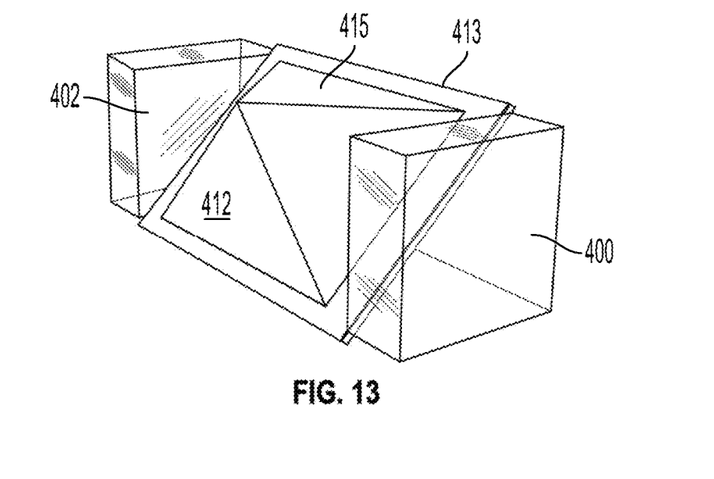

The opposing wall may be continuous with the first channel and the second channel. As shown in FIGS. 4, 5, and 6, the opposing wall may be comprised of multiple wall sections 424, 426, and 428, or an intersection of wall sections 430, which may be a wall section edge.

The opposing wall, the first end, and the second end may form a throughspace 410, which may provide for fluid communication between the first channel, the diaphragm section, and the second channel.

The diaphragm may be disposed between the first end and the second end. As shown in FIGS. 4, 5, 8, 9, and 10, the diaphragm may enter the throughspace when in a closed position. As shown in FIGS. 6, 7, 11, 12, and 13, the diaphragm may vacate the throughspace when in an open position.

The diaphragm may comprise a central portion 412 and a perimetral portion 413. The central portion may form a fill-bulge 414 or a vacate-bulge 415, and a bulge may be substantially concave, as shown in FIGS. 4, 5, 6, and 7, or pyramidal, as shown in FIGS. 8, 9, 10, 11, 12, and 13. The central portion may have a first side 416 and a second side 417, with the first side exposed to the opposing wall and the second side opposite the first side.

The first and second channel may comprise one or more side walls, 418 and 420. The channels may feature primary axes, 422 and 425, respectively, and cross sections unto which the axes are orthogonal. The axes may be substantially perpendicular, as in FIGS. 4, 5, 6, and 7, or substantially coaxial, as in FIGS. 8, 9, 10, 11, 12, and 13.

A frame 427 may be disposed in the first channel or first end. The diaphragm, when in the closed position, may seal the frame by pressing against the frame, thereby impeding between the first and second channel.

The invention claimed is:

1. A flow control device comprising:
a first channel comprising a first duct having an opening of a fixed cross-sectional area;
a second channel comprising a second duct having an opening of a fixed cross-sectional area; and
a diaphragm positioned between the opening of the first channel and the opening of the second channel, wherein the diaphragm includes a first side and a second side that faces an opposite direction as the first side,
wherein the diaphragm is configured and arranged to alternatively operate in both: a closed condition in which flow from the first channel to the second channel is impeded, and an open condition in which flow from the first channel to the second channel occurs,
wherein the diaphragm is configured and arranged to change from the closed condition to the open condition when a force of a positive fluid flow through the first channel towards the first side of the diaphragm exceeds a combination of a gravitational force and a force of atmospheric pressure upon the second side of the diaphragm, and further wherein:
said diaphragm includes a concave contour in a central portion thereof, when considered from the second side, when said diaphragm is in the closed condition; and
said central portion of said diaphragm changes to a convex contour, when considered from the second side, when said diaphragm is in the open condition.

2. The flow control device according to claim 1, wherein:
said first channel includes a primary axis that extends in a first axial direction; and
said second channel includes a primary axis that also extends in said first axial direction.

3. The flow control device according to claim 1, wherein:
said first channel includes a primary axis that extends in a first axial direction; and
said second channel includes a primary axis that extends in a second axial direction that is perpendicular to said first axial direction.

4. The flow control device according to claim 1, further comprising:
a sloped edge associated with and extending from said first channel towards said diaphragm, wherein said sloped edge is sloped with respect to an axial direction of said first channel, and further wherein said sloped edge is configured and arranged to contact the first side of said diaphragm to thereby seal between said first channel and said second channel when the diaphragm is in the closed condition, and still further wherein said sloped edge is configured and arranged to be out of contact with said first side of said diaphragm when the diaphragm is in the open condition.

5. The flow control device according to claim 1, further comprising:
a sloped edge associated with and extending from said second channel towards said diaphragm, wherein said sloped edge is sloped with respect to an axial direction of said second channel, and further wherein said sloped edge is configured and arranged to contact the first side of said diaphragm to thereby seal said first channel and said second channel when the diaphragm is in the closed condition, and still further wherein said sloped edge is configured and arranged to be out of contact with said first side of said diaphragm when the diaphragm is in the open condition.

6. The flow control device according to claim 1, further comprising:
an edge associated with and extending from said first channel towards said diaphragm, wherein said edge is configured and arranged to contact the first side of said diaphragm to thereby seal between said first channel and said second channel when the diaphragm is in the closed condition, and further wherein said edge is configured and arranged to be out of contact with said first side of said diaphragm when the diaphragm is in the open condition.

7. The flow control device according to claim 1, further comprising:
an edge associated with and extending from said second channel towards said diaphragm, wherein said edge is configured and arranged to contact the first side of said diaphragm to thereby seal between said first channel and said second channel when the diaphragm is in the closed condition, and further wherein said edge is configured and arranged to be out of contact with said first side of said diaphragm when the diaphragm is in the open condition.

8. The flow control device according to claim 1, wherein the diaphragm is substantially pyramidal in shape, as defined by four substantially flat surfaces.

9. The flow control device according to claim 8, wherein said four substantially flat surfaces are each generally triangular shaped.

10. A flow control device comprising:
a first channel;
a second channel; and
a diaphragm positioned in a diaphragm section between the first channel and the second channel, wherein the diaphragm includes a first side and a second side that faces an opposite direction as the first side,
wherein the diaphragm is configured and arranged to alternatively operate in both: a closed condition in which flow from the first channel to the second channel is impeded, and an open condition in which flow from the first channel to the second channel occurs,
wherein the diaphragm is configured and arranged to change from the closed condition to the open condition when a force of a positive fluid flow through the first channel towards the first side of the diaphragm exceeds a combination of a gravitational force and a force of atmospheric pressure upon the second side of the diaphragm, and
wherein:
said first channel extends in a first axial direction;
said second channel also extends in said first axial direction;
an outermost peripheral edge of the diaphragm defines a single plane, when the outermost peripheral edge is considered in its entirety; and the outermost peripheral edge of the diaphragm includes a leading edge that faces towards the first channel and a trailing edge that faces towards the second channel, wherein the leading edge is positioned within the diaphragm section directly within a flowpath of the flow from the first channel; and further wherein:

said diaphragm includes a concave contour in a central portion thereof, when considered from the second side, when said diaphragm is in the closed condition; and said central portion of said diaphragm changes to a convex contour, when considered from the second side, when said diaphragm is in the open condition.

11. The flow control device according to claim 10, wherein the diaphragm is substantially pyramidal in shape, as defined by four substantially flat surfaces.

12. The flow control device according to claim 11, wherein said four substantially flat surfaces are each generally triangular shaped.

13. The flow control device according to claim 10, wherein the single plane of the outermost peripheral edge of the diaphragm extends in a direction that is parallel with respect to the first axial direction.

14. A flow control device comprising:

a first channel;

a second channel; and a diaphragm positioned in a diaphragm section between the first channel and the second channel, wherein the diaphragm includes a first side and a second side that faces an opposite direction as the first side, wherein the diaphragm is configured and arranged to alternatively operate in both: a closed condition in which flow from the first channel to the second channel is impeded, and an open condition in which flow from the first channel to the second channel occurs, wherein the diaphragm is configured and arranged to change from the closed condition to the open condition when a force of a positive fluid flow through the first channel towards the first side of the diaphragm exceeds a combination of a gravitational force and a force of atmospheric pressure upon the second side of the diaphragm, and wherein:

said first channel extends in a first axial direction;

said second channel extends in a second axial direction, and further wherein said first axial direction is coaxial with said second axial direction;

an outermost peripheral edge of the diaphragm defines a single plane, when the outermost peripheral edge is considered in its entirety; and the outermost peripheral edge of the diaphragm includes a leading edge that faces towards the first channel and a trailing edge that faces towards the second channel, wherein the leading edge is positioned within the diaphragm section directly within a flowpath of the flow from the first channel; and further wherein:

said diaphragm includes a concave contour in a central portion thereof, when considered from the second side, when said diaphragm is in the closed condition; and said central portion of said diaphragm changes to a convex contour, when considered from the second side, when said diaphragm is in the open condition.

15. The flow control device according to claim 14, wherein the diaphragm is substantially pyramidal in shape, as defined by four substantially flat surfaces.

16. The flow control device according to claim 15, wherein said four substantially flat surfaces are each generally triangular shaped.

17. The flow control device according to claim 14, wherein the single plane of the outermost peripheral edge of the diaphragm is sloped at an angle between 25 and 65 degrees with respect to the first axial direction.

18. The flow control device according to claim 14, the single plane of the outermost peripheral edge of the diaphragm is sloped with respect to at least one of the first axial direction and the second axial direction.

\* \* \* \* \*